Aug. 21, 1956   J. C. BLOOM   2,759,743
HIGH TOLERANCE SEALED JOINTURE FOR HYDRAULIC CONNECTIONS
Filed Jan. 21, 1949

INVENTOR.
JOHN C. BLOOM
BY
*Edwin Coates*
ATTORNEY.

United States Patent Office 2,759,743
Patented Aug. 21, 1956

2,759,743

HIGH TOLERANCE SEALED JOINTURE FOR HYDRAULIC CONNECTIONS

John C. Bloom, Los Angeles, Calif., assignor to Douglas Aircraft Company, Inc., Santa Monica, Calif.

Application January 21, 1949, Serial No. 71,835

2 Claims. (Cl. 285—95)

This invention relates to fluid sealing devices and particularly to those for sealing the joints of high pressure hydraulic lines such as those employed in operating certain components of aircraft.

In such joints, a rubber O-ring is usually employed alone to seal the peripheral cavity between the male fitting and the female fitting or boss. Such sealing members, while quite effective when the tolerances of the joint components are maintained within a closely limited range, fail as seals when these tolerances occupy a wide range, particularly the angular tolerances between the tube axis and the adjacent face of the boss or body member, because of the inability of the O-rings to accommodate themselves to the aforementioned cavity when its length or width vary materially. Moreover, even though O-rings are self-adjusting, blowouts are commonplace because of the fact that in conventional fittings the metallic jam nut usually employed to force the O-ring into the cavity and to seal with it, contacts the metallic face of the female fitting with a wide metal to metal contact which of necessity leaves a gap that, although minute, is sufficient to allow the fluid to be forced therethrough under the high pressures utilized, and even to permit extrusion of the O-ring.

By employing a jam nut having on its lower face a rigid annulus with at least one sharp durable cutting edge and interposing, between this edge and the face of the boss or body member, a disk or annulus of relatively thick but pliant, axially compressible, radially extensible material, such as leather, a leather-equivalent, one of the well known cork and rubber compositions of the type employed in some shoe soles, or the like, when the jam nut is tightened down towards the boss. The aforesaid cutting edge penetrates the leather annulus and surface-flows the portion penetrated, radially outwardly and inwardly, to a distance dependent upon the reach of the nut. Thereby the leather annulus is partially or completely divided radially into two concentric annuli, more or less separated from each other, leaving a greater or lesser thickness of leather under the annular ring. When the jam nut is reached sufficiently to completely sever the leather disk into two portions, a washer of a predetermined radius and a selectively variable thickness proportioned to the size of the seal cavity is formed. The thickness of the inner seal member can be varied in proportion to the varying volumes of the cavity to be filled by the inner seals by merely varying the compression applied to the jam nut. This selectively formed backup member plus the O-ring completely fills the seal cavity. At the same time, the jam nut forces the separated inner portion of the backup washer downwardly tightly against the O-ring, densifies and immobilizes both of these inner seal members, and forces them into engagement with the adjacent surfaces with a fluid-tight contact that is proof against all pressures, impulses and cycles at present employed in aircraft hydraulic equipment. More specifically, it provides a satisfactory seal against fluid pressures at least of the order of 4,500 p. s. i. for as many as 100,000 cycles of operation. Because of the excess thickness of the leather annulus, the nut while being forced downwardly in a manner such as to set up the aforementioned "surface overflow" action, at the same time permits extra tightening of the nut to render the inner seal members of an extreme density and to completely immobilize them. The excess thickness and overflow feature also provide a satisfactory and effective seal even with parts having cavity dimensions far exceeding drawing-tolerance dimensional limits, because it provides excess material both axially and radially of the joint to fill the seal cavity full, no matter what reasonable variation in the volume of the cavity as related to the volume of the sealing members, may occur. Contrary to the capabilities of an ordinary flatfaced jam nut, the thin edge of the annular cutting ring allows the lower extremity of the nut to approach the upper surface of the boss or body member of the fitting more closely than has hitherto been possible in such joints. Thereby the gap usually existing between the ordinary jam nut and the boss and determined by the fact that the flat face of the ordinary jam nut and the incompletely compressible washer will not allow direct contact of the jam nut with the boss, is reduced to the minimum while permitting the internal seal members to be still more tightly compressed, densified, immobilized, and fluid tightly engaged with the adjacent surfaces.

Other accomplishments and advantages of the invention will become apparent as this disclosure proceeds.

In order to further clarify and to exemplify these and other inventive concepts, the now preferred embodiments of the invention are illustrated in the accompanying drawing and are described hereinafter in conjunction therewith. In the drawing.

Figure 1:
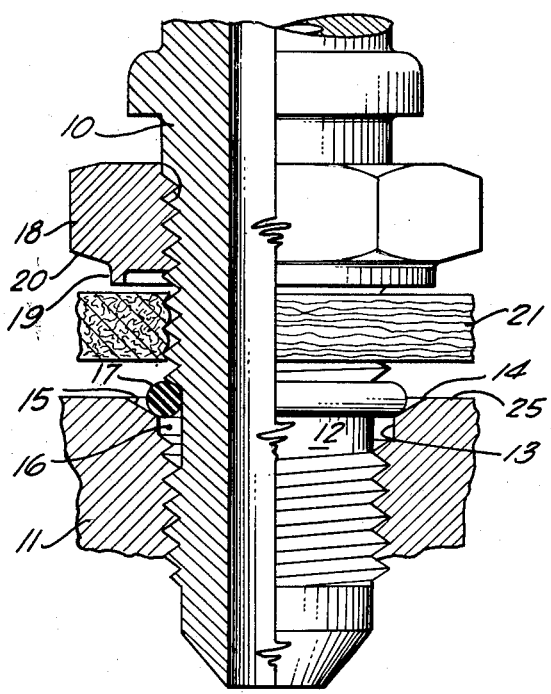
Figure 1 is a view partly in elevation and partly in section of a fitting including the invention in process of installation, with the parts of the seal in their initial condition.

In the particular embodiment selected for purposes of exemplification, the construction comprises a universal hydraulic fitting member 10, the connecting portion or inner end of which is shown mated with the boss or body member 11 of the apparatus which is to receive the hydraulic fluid. The fluid-introducing member 10 is threaded on its exterior periphery, the threads being formed in upper and lower runs separated by a peripherally extending thread relief 12. The threaded aperture in the boss or body member is widened at its upper extremity, being there provided with a cylindrical counterbore 13. The upper edge of this counterbore is bevelled, as at 14, to provide a concave seat 15, surrounded by flat face 25 on boss 11.

The annular cavity 16 lying radially between the cylindrical surface of the thread relief and the diametrically opposed wall of the counterbore and bounded vertically by the first turn of the lower run of threads and by the last turn of the upper run of threads, is in the conventional manner, adapted to be occupied by a flexible resilient seal member 17 here shown as an O-ring of rubber or equivalent composition tightly encircling the member 10 in the thread relief region thereof. However, for the extremely high pressure fluid power transmission duty for which the present invention is contemplated, and in view of the wide variation in drawing tolerances occurring in the counterbore and the thread relief in this particular field, the employment of such ring alone gives rise to many undesirable conditions which must be met and overcome as aforementioned. The ring can not assume such shape and dimensions when the member 10 is screwed inwardly to its full extent as to sealingly fill all the volume then provided in the seal cavity 16, nor can it alone withstand the working stresses to which it is subjected by the vibrations and impulses of the fluid passing through the member 10.

To meet and overcome the aforesaid difficulties, the broad, flat-faced jam nut usually employed to force the O-ring into the seal cavity and seal the faying surfaces is replaced by a jam nut 18 provided with a lower face constructed in a novel manner. The said face is provided, at a location lying radially outwardly of the bevel 14, with an annular flange 19 projecting downwardly therefrom and parallel to the axis of the member 10. Outwardly of this flange, the inner face of the jam nut is, instead of being a planar continuation of the inner portion of this face, angled sharply upwardly as at 20. Thus, the lower face of the jam nut is distinctly different from the flat, broad uninterrupted face of the conventional jam nut which lies perpendicular to the connector axis in all portions thereof.

Interposed between the jam nut and the upper surface of the boss or body member is a disk 21 of material which is fluid proof, friction resistant, pliant, yieldable, axially compressible, radially extensible and compressible, flowable, porous, non-deformable or settable and non-resilient but returnable almost to original shape. Leather has been found to possess most, if not all, of these properties although leather-equivalents, cork-rubber compositions such as are employed in shoe soles, and the like, may be employed instead of leather. The disk 21 is initially oversized both axially and radially; that is, it has an initial thickness and diameter indefinitely greater than that necessary to fill the conventional cavity to be sealed by it and the O-ring.

It will be perceived that the flange 19 is rectangular at each lower corner and thus provides a hard, sharp edge at each of said corners.

Figure 2:
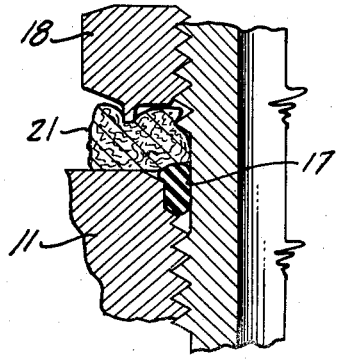
Figure 2 is a fragmentary, longitudinal section thereof with the essential movable parts of the seal in a further stage of the installation of the device.

The parts being thus shaped, characterized and positioned relatively to each other, when the jam nut 18 is set up upon or reached downwardly upon the threads of the member 10, the flange 19 will penetrate the member 21 while forcing it axially bodily downwardly upon the upper surface 25 of the boss or body member 11 and against the O-ring, distorting both said components into the intermediate shapes and conditions shown in Figure 2. That is to say, the flange will, while pushing the member 21 downwardly, compress the region thereof that lies thereunder, causing the upper portion of the member 21 to flow radially and vertically both outwardly and inwardly. At the same time the O-ring will be moved inwardly and downwardly off the concave seat 15 and will be elongated axially and compressed radially into the cavity 16 as shown in Figure 2.

Figure 3:
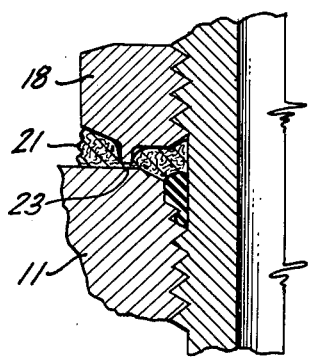
Figure 3 is a similar view of the seal in its final condition.

Further reaching of the nut 18 upon the member 10 will, as shown in Figure 3, extrude the inner portion of the member 21 upwardly and radially and also downwardly, forcing the O-ring fluid tightly into the lower portion of the cavity 16 while the outer portion of the member 21 will be still further overflowed outwardly and upwardly passing outwardly through the clearance space provided by the outer face 20 of the nut. In this embodiment, however, an annular portion 23 of the member 21 is left between the flange 19 and the upper face 25 of the boss, the jam nut not being screwed down to an extent sufficient to sever the member into two rings or make the flange contact the boss surface with a metal to metal contact. Consequently, the possibility of the conventional metal to metal gaps existing between the nut and the boss or body member 16 obviated, thereby minimizing the possibility of blow-outs. The inner portion of the member 21 is flowed radially against the upper portion of the thread relief and axially against the concave seat and the O-ring and the latter is expanded radially fluid tightly against the thread relief and against the counterbore as well as being extruded into the first turn of the threads of the members 10 and 11. The fitting seal cavity is therefore matched substantially perfectly to withstand fluid pressures of an order exceeding 4500 pounds p. s. i. and vibrations or impulses of substantial magnitude for long periods of time.

The drawing tolerance variations, both axially and radially, in the fitting seal cavity are accommodated fluid tightly by this combination because of the fact that the oversized member 21 can be intercepted by the jam nut flange with any degree of compressive force desired by merely varying the reach of the nut. If the cavity is large, the seal can be established fluid tightly with only a few downward turns of the nut against the member 21 so as to match this axially long cavity or if the cavity axial length is not excessively long but high fluid pressures must be sealed and blow-out gaps reduced, then the nut can be jammed down until its flange substantially contacts the boss as shown in Figure 3. In either case, the member 21 is adapted to match the seal cavity perfectly and compensate for tolerance variations in the dimension of said cavity.

If it is desired to remove the outer portion of the member 21 from the joint, it is only necessary to jam the nut its full extent against the face 25 of the body member whereupon one or both cutting edges of the flange will completely sever this outer portion from the inner portion instead of merely segregating, or partially separating, it therefrom as shown in Figure 3.

Figure 4:
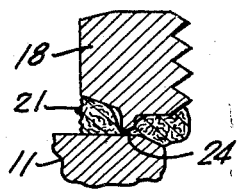
Figure 4 is a somewhat similar view of another form of one of the components of the device.

In order to facilitate this severing action while reducing the area of metal to metal contact, the form shown in Figure 4 provides a single sharp cutting edge 24 which lies on the outer periphery of the flange and is adapted, when the nut is jammed against the body member, to reduce the metal to metal contact area between the flange and the body member to a circle, thereby reducing as far as is possible the chances of a blowout occurring under excessive loads or loads not contemplated in designing a fitting of this particular size and strength.

Although certain quite specific and particularized parts and arrangements for carrying out the concepts of the invention have been hereinabove set forth, it is to be understood that this has been done merely to render the invention more definite and clear and in no wise limits the invention itself, which can take any form or construction or embody any number and character of parts and configurations that lies within the scope of the following claims. The invention is therefore to be understood as consisting of the concepts and principles hereinabove set forth and defined in their physical aspects in the annexed claims.

I claim:

1. A high-tolerance, sealed jointure for hydraulic connections, comprising: a threaded body member having an upper face; a threaded fitting extending thereinto with a peripheral cavity between a portion thereof and the adjacent portion of the body, said cavity having unknown dimensions which may vary so widely and indeterminately from maximum drawing tolerances as to preclude the use of a pre-formed, final-sealing member; an elastically deformable annular sealing ring, disposed in the lower portion of said cavity around said fitting and tending to be extruded radially outwardly through the jointure by fluid pressure; a jam nut having an annular severing die projecting from its lower face toward the upper face of said body member and having a wall thickness which is only a minor fraction of the radial thickness of the body of said jam nut; and an annular, tough and pliant, compressible and flowable sealing element, the annulus containing a total volume of material larger than that needed to merely prevent extrusion of said O-ring by said fluid pressure and to "back-up" said O-ring, and said volume being larger than the volume available in said cavity for the annulus in the unstressed condition of same and available between said nut and body member for said annulus in the unstressed condition of same, interposed between that portion of the upper face of said body member that lies in the region of said jointure, and the entire lower face of said nut, and interposed around said fitting to be compressively contacted and severed by said die into radially inner and outer portions, the inner portion being urged bodily radially inwardly and longitudinally upwardly and downwardly into said cavity and into fluid tight engagement with said sealing ring, fitting, nut, and body to match said cavity substantially perfectly and compensate, volume for volume, for the unknown variations of said cavity from said tolerances while preventing extrusion of said sealing ring radially outwardly through said jointure.

2. A high-tolerance sealed jointure for hydraulic connections, comprising: a body member; a fitting extending thereinto with a peripheral cavity between a portion thereof and the body and having unknown dimensions which may vary so widely and indeterminately from maximum drawing tolerances as to preclude the use of a preformed sealing member of a size predeterminable by the size of the cavity; an elastically deformable annular sealing ring disposed in the lower portion of said cavity around said fitting; a jam nut having an annular flange projecting downwardly from its lower face toward the upper face of said body member and lying radially intermediate, and separate from, both the inner and the outer peripheries of said nut; the lower face of said flange being angled upwardly and inwardly to produce a relatively sharp cutting edge and providing an annular gap between said upwardly angled lower face and the upper face of said body member when the latter is contacted by said flange, said angular gap lying radially beyond the outer periphery of said cavity a distance sufficient to enable said fitting to tilt laterally about its minor, or transverse, axis, while sealedly engaged in said body, an angular amount sufficient to greatly widen the range of angular tolerances permissible between the longitudinal axis of said fitting and the adjacent face of said body; and an annular, tough and pliant, compressible and flowable, sealing member interposed between that portion of the lower face of the nut that lies in the jointure region and the upper face of the body member and extending from the inner periphery of the nut and the body to the outer periphery of the nut and to the sub-adjacent portion of the body and having a portion to be contacted and substantially severed by said flange into an outer portion and an inner portion adapted to match said cavity, volume for volume.

References Cited in the file of this patent

UNITED STATES PATENTS

| | | |
|---|---|---|
| 1,365,151 | Burke | Jan. 11, 1921 |
| 1,372,628 | Mueller et al. | Mar. 22, 1921 |
| 2,125,372 | Fox | Aug. 2, 1938 |
| 2,342,425 | Parker | Feb. 22, 1944 |
| 2,343,235 | Bashark | Feb. 29, 1944 |
| 2,373,253 | Martin | Apr. 10, 1945 |
| 2,437,814 | Hallen | Mar. 16, 1948 |
| 2,447,536 | Robinson | Aug. 24, 1948 |

FOREIGN PATENTS

| | | |
|---|---|---|
| 8,203 | Great Britain | Apr. 25, 1894 |